Figure 1:
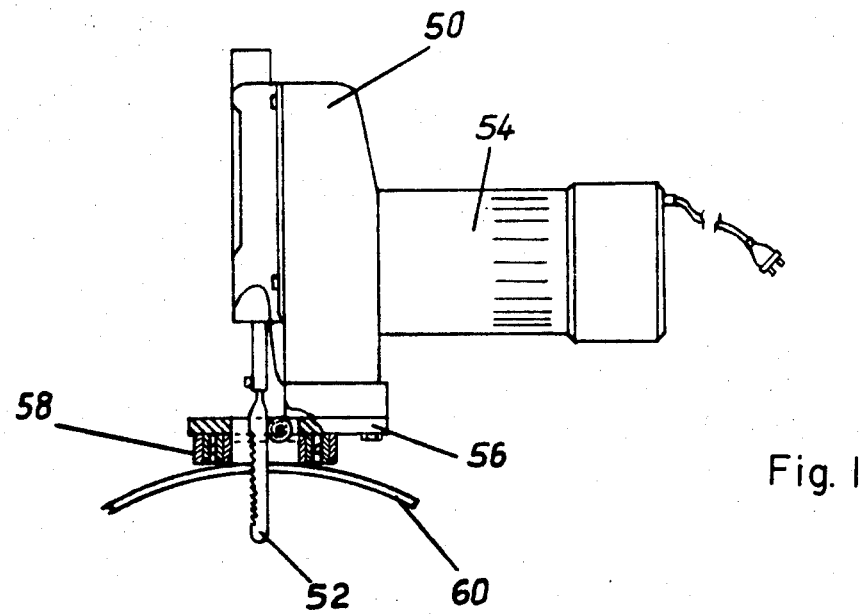

United States Patent [19]
Spengler

[11] 3,707,768
[45] Jan. 2, 1973

[54] SAW FOR MACHINING A WORKPIECE HAVING A CURVED SURFACE

[75] Inventor: Ernst Maximilian Spengler, Huessenstamm, Germany

[73] Assignee: Roeder & Spengler OHG, Bergen-Enkheim, Hessen, Germany

[22] Filed: Nov. 12, 1970

[21] Appl. No.: 88,974

Related U.S. Application Data

[62] Division of Ser. No. 776,516, Nov. 18, 1968, Pat. No. 3,570,351.

[30] Foreign Application Priority Data

Nov. 25, 1967 Germany ............... R 47 443 138
Nov. 25, 1967 Germany ............... R 36 448 38

[52] U.S. Cl. .................. 30/166, 30/273, 143/68 E
[51] Int. Cl. ............................................. B23d 49/16
[58] Field of Search ....143/68 E, 68 F, 68 G; 30/166, 30/273

[56] References Cited

UNITED STATES PATENTS

| 1,808,228 | 6/1931 | Hulack | 143/68 G |
| 2,537,501 | 1/1951 | Woodward | 143/68 E |
| 3,436,824 | 4/1969 | Huston | 30/273 |

FOREIGN PATENTS OR APPLICATIONS

| 201,859 | 1/1955 | Australia | 143/68 |

*Primary Examiner*—Robert C. Riordon
*Assistant Examiner*—J. C. Peters
*Attorney*—Wolfgang G. Fasse

[57] ABSTRACT

The present saw has a curved workpiece support which is rotatably attached to the saw by a bearing through which the saw blade extends whereby a curved surface workpiece may be cut so that the saw blade extends perpendicularly relative to the curved surface at all times during the cutting operation.

3 Claims, 2 Drawing Figures

PATENTED JAN 2 1973    3,707,768

SAW FOR MACHINING A WORKPIECE HAVING A CURVED SURFACE

The present application is a divisional application of my copending application Ser. No. 776,516 filed Nov. 18, 1968, now U.S. Pat. No. 3,570,351, granted Mar. 16, 1971.

The present invention relates to a saw for machining a work-piece having a curved surface, more specifically, the invention relates to saws for cutting slots into curved surfaces.

It is the main object of the invention to enable the cutting of precisely located slots into curved surfaces, for example, in connection with rotary die stamping tools which employ cutting edges inserted into a cylindrical support member.

For achieving the above main object it is necessary to precisely guide the workpiece and to assure that the cutting angle between the saw blade and the workpiece surface remains constant during the cutting operation regardless of the curvature of the workpiece surface and independently of the instantaneous position of the workpiece relative to the saw blade.

Yet another object of the invention is to assure that the saw blade will extend perpendicularly relative to the surface of the workpiece during the entire cutting operation.

Still another object of the invention is to provide a rotatable workpiece support having a curved surface the curvature of which corresponds substantially to that of the workpiece.

Another object of the invention is to provide a curved workpiece support which is rotatable about an axis coinciding with the serrated cutting edge of the saw blade.

A still further object is to provide a power saw for cutting or machining curved surfaces whereby the saw itself may be a portable jigsaw, or a coping saw, or a scroll saw.

Yet another object is to arrange the curved workpiece support for a saw in such a manner that the support having a given curvature may be exchanged by another workpiece support having a different curvature, that is, a different radius of curvature.

Still another object of the invention is to devise mounting means for curved workpiece supports of a saw so that either the concave or the convex surface of such supports may contact the workpiece.

Figure 2:
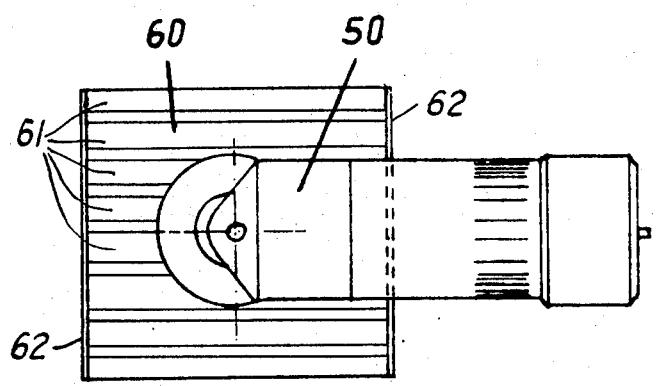

In order that the invention may be clearly understood, it will now be described, by way of example, with reference to the accompanying drawings, wherein:

FIG. 1 is a side view of a portable jigsaw provided with a workpiece support according to the invention; and FIG. 2 shows a tope view of an embodiment similar to that shown in FIG. 1, but the workpiece support is made up of a plurality of curved spacer members.

Referring to FIGS. 1 and 2 illustrating side and top views of a portable jigsaw, there is shown a workpiece support 60 according to the invention.

A saw blade 52 is guided in a housing 50 to reciprocate back and forth through an aperture in a workpiece support member 60. The blade 52 is driven by a motor 54.

To the bottom of the housing 50 there is attached a holding plate 56 to which, in turn, is secured one race of a bearing 58. The other race of bearing 58 is secured to the support member 60. The plate 56, with its aperture for the saw blade 52, the bearing 58 and the support member 60 are located relative to the saw blade 52 in such a manner that the member 60 may rotate about an axis coinciding with the serrated edge of the saw blade 52.

FIG. 2 illustrates that the support member 60 need not necessary have a round form in the shape of a calotte but may have a curved square or curved rectangular shape. In any event, the support member 60 will be provided with an aperture for the passing of the saw blade, and is made up of a plurality of curved spacer members 61 interconnected along their ends 62.

In the embodiment the concave portion of support member 60 is adapted to contact the workpiece.

As mentioned above, the support surface or member need not be a continuous piece but may comprise according to the invention curved spacer members which in FIG. 1 would be rotatably attached to plate 56. The spacer members adjacent the saw blade 52 would have equal spacings from the saw blade and pairs of such spacer members would have equal heights so that the saw blade and especially its cutting edge will always be guided precisely radially relative to the surface of the workpiece.

Although the invention has been described with reference to specific examples, it is intended that the invention is not to be limited to such examples but that it shall cover all modifications and equivalents within the scope of the appended claims and details may be adapted to the respective requirements within such scope of the claims.

What I claim is:

1. In a saw for machining a workpiece having a curved surface, a saw blade, a housing, power means in said housing for driving the saw blade, workpiece support means having a curved surface with a curvature corresponding substantially to that of the workpiece, mounting means for rotatably attaching the workpiece support means to the saw, whereby the saw blade extends perpendicularly to the curved workpiece surface at all times during the machining operation, the improvement that said mounting means comprise a bearing having an outer race and an inner race with a central opening through the inner race, means for rigidly attaching one of the said bearing races to said workpiece support means, a plate attached to said saw housing and having an aperture through the plate, further means for rigidity attaching the other of said bearing races to the plate in such position that the aperture through the plate and the central opening through the inner bearing race register with each other whereby the passage of the saw blade through the plate and the bearing is assured.

2. The saw according to claim 1, wherein said workpiece support means has a convex and a concave surface, said convex surface being attached to said bearing, the concave surface being adapted for contacting the workpiece.

3. The saw according to claim 1, wherein said workpiece support means comprises curved spacer members.

* * * * *